(12) United States Patent
Seff

(10) Patent No.: US 6,791,030 B1
(45) Date of Patent: Sep. 14, 2004

(54) ROTATING BRACKET FOR ELECTRICAL RECEPTACLE

(75) Inventor: Paul David Seff, Lincoln, IL (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 10/440,499

(22) Filed: May 16, 2003

(51) Int. Cl.[7] .............................................. H01H 9/02
(52) U.S. Cl. ...................... 174/58; 174/53; 174/135; 439/131
(58) Field of Search ....................... 174/53, 57, 135, 174/58, 54, 48; 439/131, 107; 52/39; 220/3.3

(56) References Cited

U.S. PATENT DOCUMENTS

| | | | | |
|---|---|---|---|---|
| 5,122,069 A | * | 6/1992 | Brownlie et al. | 174/53 X |
| 5,486,650 A | * | 1/1996 | Yetter | 174/53 |
| 5,773,757 A | * | 6/1998 | Kenney et al. | 174/53 |
| 5,941,724 A | * | 8/1999 | Reed | 439/346 |
| 6,491,539 B1 | * | 12/2002 | Johnston | 439/373 |

\* cited by examiner

*Primary Examiner*—Dhiru R Patel
(74) *Attorney, Agent, or Firm*—Martin J. Moran

(57) ABSTRACT

The present invention provides a bracket structured to support a ground fault circuit receptacle assembly and to be rotatably attached to an electrical receptacle enclosure assembly housing assembly. The rotatable bracket includes an opening sized to allow the face plate of the ground fault circuit receptacle assembly to be exposed. The bracket further rotates between a first position, wherein the ground fault circuit receptacle assembly electrical couplings are exposed, to a second, operational position. In the first position, conductors may be easily attached to a ground fault circuit receptacle assembly electrical coupling.

10 Claims, 4 Drawing Sheets

ROTATING BRACKET FOR ELECTRICAL RECEPTACLE

BACKGROUND OF THE INVENTION

1. Field of the Invention

The present invention relates to wiring receptacle assembly and, more specifically, to a rotating bracket disposed within a wiring receptacle assembly that allows a ground fault circuit receptacle to be rotated between a coupling position and an operation position.

2. Background Information

Prior art electrical receptacles located in outdoor, or wet, locations were typically protected from the elements by covers over the individual outlets. Each cover included a resilient seal that would resist the passage of water or other contaminants. These covers were generally coupled to a spring that biased the cover into a closed position when the receptacle was not in use. When a user needed to plug a device into the receptacle, the cover was moved to an open position and the plug inserted into the receptacle. This system provided adequate protection while the cover was in the closed position, and so long as the user remembered to unplug any devices before the receptacle was exposed to inclimate weather or otherwise exposed to water.

This system, however, suffered from disadvantages. For example, a user could forget a device was plugged in leaving the receptacle exposed to elements. Other devices, such as holiday lights, were intentionally left plugged in to a receptacle in a wet location during inclimate weather. Additionally, the resilient seal on the cover could become degraded due to general wear and tear, thus requiring a replacement of the cover assembly and potentially allowing the receptacle to be damaged. Moreover, in view of these disadvantages, the National Electric Code, section 406.8, has been amended to reflect that receptacles in wet location must be enclosed, even during use.

An enclosure for receptacles in wet locations may be a simple housing with a sealable cover as is know in the prior art. However, such enclosures typically have the ground fault circuit receptacle assembly placed behind an internal cover plate, called a deadfront, and attached to the back of the housing. This configuration makes coupling the conductors to the ground fault circuit receptacle assembly electrical couplings difficult as the ground fault circuit receptacle assembly electrical couplings are located on the side opposite the outlets.

Accordingly, there is a need for a wiring receptacle assembly wherein the ground fault circuit receptacle assembly electrical couplings are easy to access.

There is a further need for a device within a receptacle enclosure to allow the ground fault circuit receptacle assembly to be easily moved from a coupling position to an operational position.

SUMMARY OF THE INVENTION

These needs, and others, are met by the present invention which provides a bracket structured to support a receptacle and to be rotatably attached to an enclosure. The rotating bracket includes an opening sized to allow the face plate of a ground fault circuit receptacle to be exposed. The bracket further rotates between a first position, wherein the ground fault circuit receptacle assembly electrical couplings exposed, to a second, operational position. In the first position, conductors may be easily attached to the ground fault circuit receptacle assembly electrical couplings.

The enclosure may also include other components, such as a disconnect assembly, and a deadfront to further protect the components. In the preferred embodiment, the deadfront includes an angled portion structured to cover the rotating bracket. The housing adjacent to the rotating bracket may include a stop device, such as a raised tab, to easily position the rotating bracket at the proper angle.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 2:
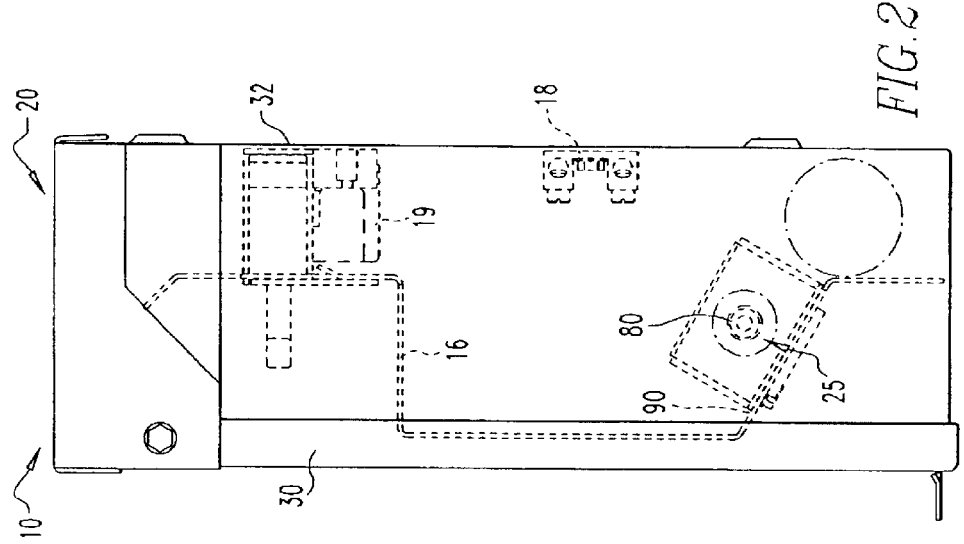
FIG. 2 shows a side view of an enclosure according to the present invention.
Figure 1:
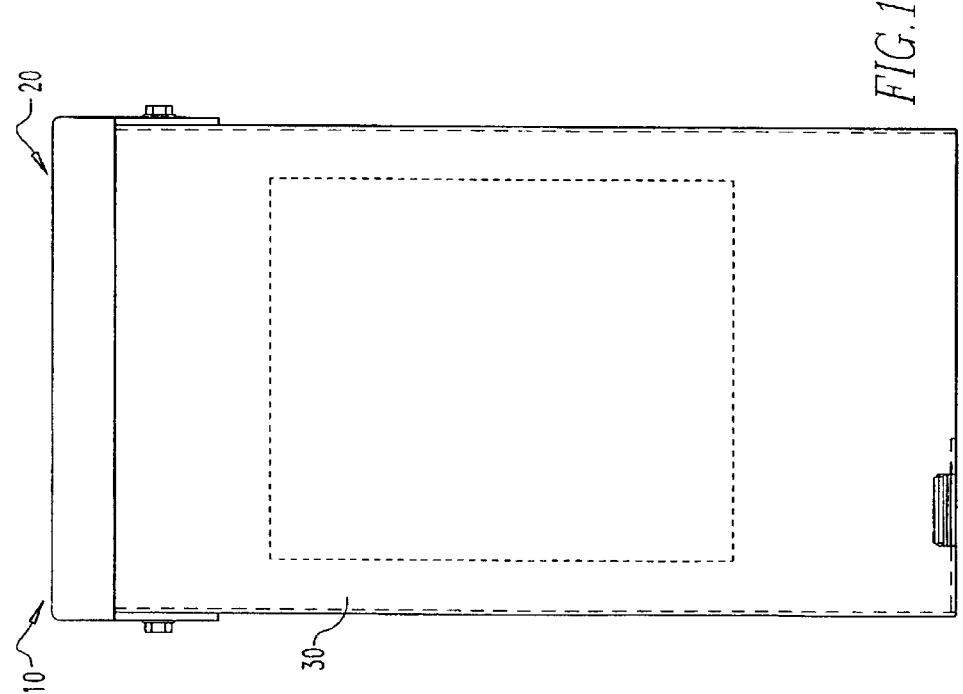
FIG. 1 shows a front view of an enclosure according to the present invention.
Figure 3:
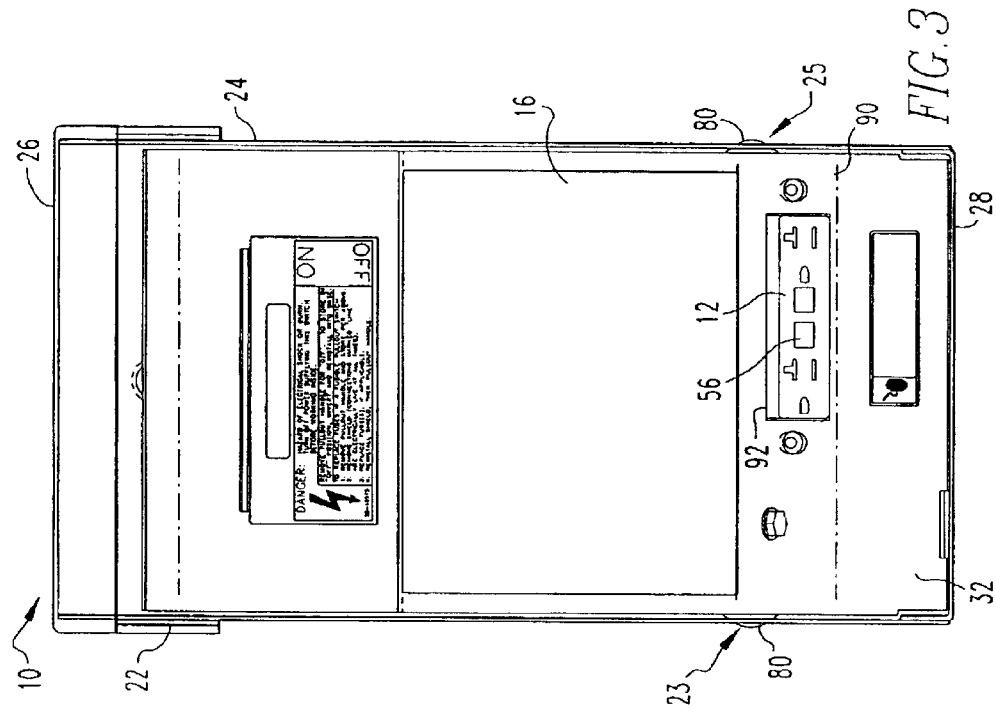
FIG. 3 shows a front view of an enclosure with the cover removed according to the present invention.
Figure 4:
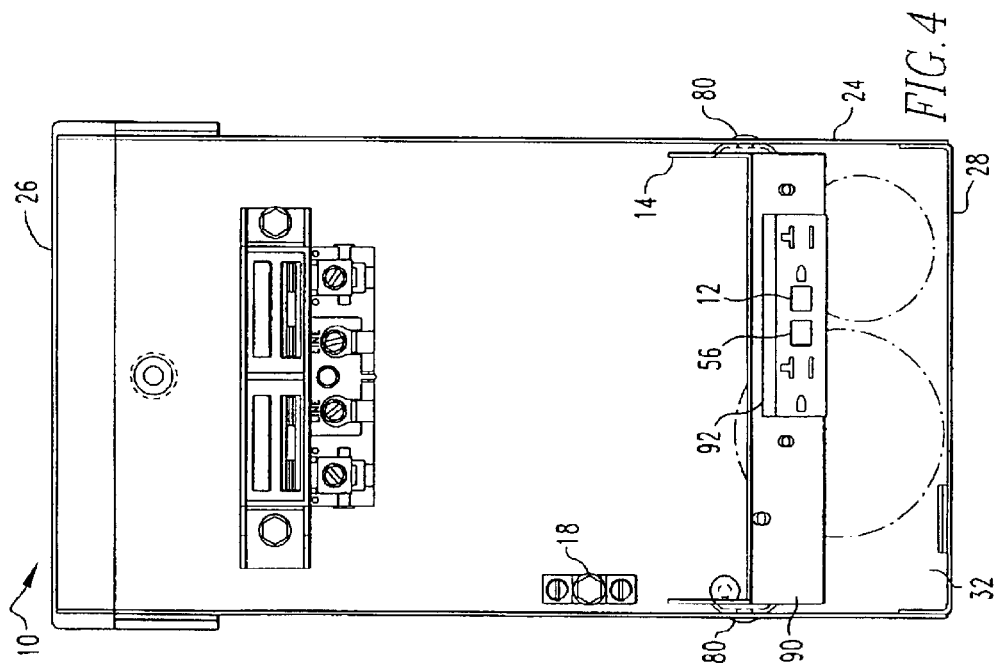
FIG. 4 shows a front view of an enclosure with the cover and the deadfront removed according to the present invention.
Figure 5:
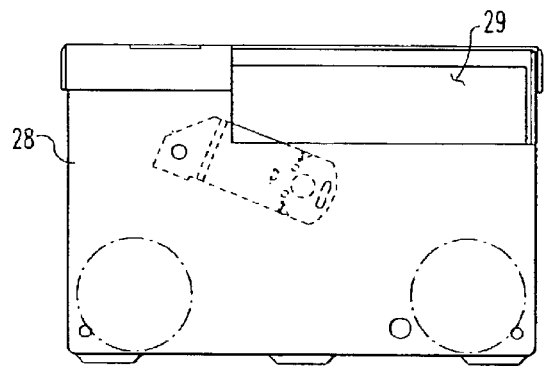
FIG. 5 is a bottom view of an enclosure according to the present invention

As shown in FIGS. 1–5, an electrical receptacle enclosure assembly 10 includes a ground fault circuit receptacle assembly 12, a U-shaped rotatable bracket 14, a deadfront 16, an electrical coupling 18 and a housing assembly 20. There may also be additional components 19 within the enclosure, such as a disconnect assembly. The housing assembly includes two pairs of generally parallel, spaced walls 22, 24 and 26, 28. The pairs of walls 22, 24, 26, 28 are generally perpendicular to each other, thereby forming a quadrilateral. The pairs of walls 22, 24, 26, 28 are joined at the corners. Two of the parallel walls 22, 24 each include a pivot opening 23, 25. The housing assembly 20 further includes a cover 30, which is rotatably attached to at least one of the walls 22, 24, 26, 28, and a back wall 32. The cover 30 is structured to move between a first, closed position wherein the cover is disposed over the walls 22, 24, 26, 28, and the back wall 32, and a second, open position wherein the cover is not disposed over the walls 22, 24, 26, 28, and the back wall 32. The electrical coupling 18 is coupled to the back wall 32 and is further coupled to external line and load conductors (not shown). As shown in FIG. 5, the bottom sidewall 28 includes an opening 29. A power cord to a device plugged into the ground fault circuit receptacle assembly 12 may pass through the bottom sidewall opening 29 while the cover 30 is in the closed position.

Figure 6:
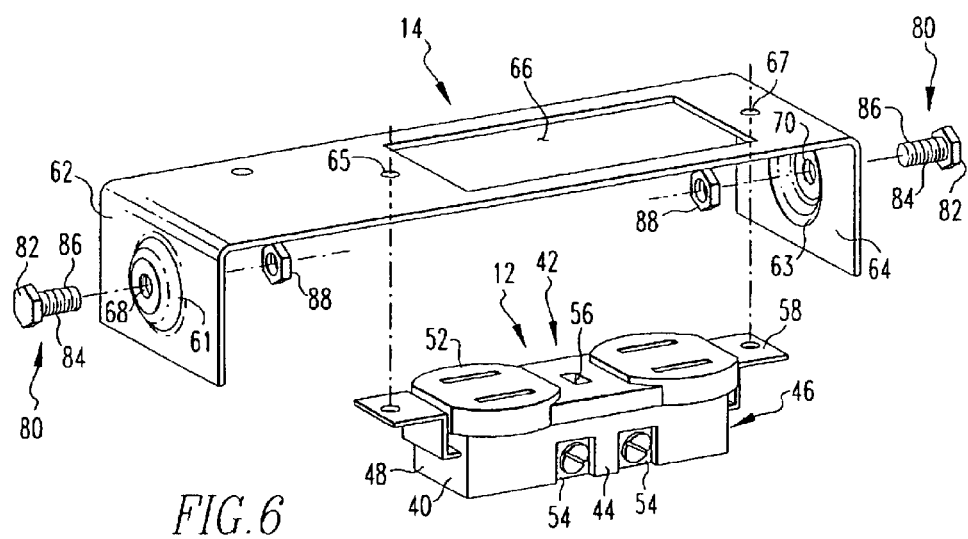
FIG. 6 is an isometric view of the U-shaped bracket.

As shown in FIG. 6, the ground fault circuit receptacle assembly 12 includes a non-conductive housing 40 having two pairs of generally perpendicular sidewalls 42, 44, 46, 48, at least one, and preferably two, outlets 50, and a face plate 52. The ground fault circuit receptacle assembly 12 further includes two electrical couplings 54 disposed on one or more of the sidewalls 42, 44, 46, 48. The electrical couplings 54 are in electrical communication with the outlets 50. The ground fault circuit receptacle assembly 12 may include a trip device 56 disposed between the electrical couplings 54 and the outlets 50. The fault circuit receptacle assembly 12 also includes a mounting bracket 58.

Figure 7:
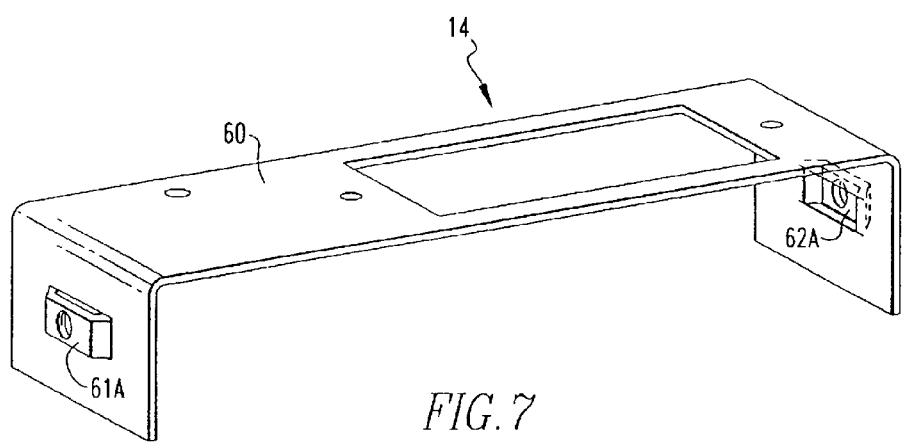
FIG. 7 is an isometric view of an alternative U-shaped bracket.

As shown in FIG. 6, the U-shaped bracket 14 includes and elongated, flat base plate 60 and two side plates 62, 64. The side plates 62, 64 are coupled to opposite axial ends of the base plate 60. The side plates 62, 64 extend in the same direction and generally perpendicular to the plane of the base plate 60. The base plate 60 has a ground fault circuit opening 66 sized to accommodate the face plate 52 of the ground fault circuit receptacle assembly 12. At each axial end of the ground fault circuit opening 66 is a mounting device. The mounting device may, for example, be threaded rods to which a nut may be attached. However, in the preferred embodiment, the mounting device is a threaded opening 65 and a screw 67 structured to engage the threaded opening 65. Each side plate 62, 64 includes a round opening 68, 70 which are aligned with each other. The U-shaped bracket 14 further includes a pivot device disposed on each side plate 62, 64. The pivot device may be pivot pins extending from the side plates, however, in the preferred embodiment, the pivot device is a pair of pivot pins 80 having a head 82, an elongated stem 84 having a threaded portion 86, and a threaded cap 88 structured to engage the stem threaded portion 86. Each side plate 62, 64 may have an outwardly extending cone 61, 63, or similar offset device structured to reduce the contact area between the U-shaped bracket 14 and the housing assembly 20. Each outwardly extending cone 61, 63 is disposed about a round opening 68, 70. As shown in the alternate embodiment in FIG. 7, the offset device may also be a flat landing 61A, 63A disposed about each round opening 68, 70.

The deadfront 16 acts as a removable cover plate disposed within the housing assembly 20 and covering the ground fault circuit receptacle assembly 12, the U-shaped rotatable bracket 14, the electrical coupling 18 and any additional components 19 within the housing assembly 20. The deadfront 16 includes an angled portion 90 having an opening 92 sized to accommodate the face plate 52 of the ground fault circuit receptacle assembly 12.

The electrical receptacle enclosure assembly 10 may be assembled as follows. The electrical coupling 18 and any additional components 19 are coupled to the housing back wall 32. The ground fault circuit receptacle assembly 12 is then coupled to the U-shaped bracket 14 with the screw 67 passing through the ground fault circuit receptacle mounting bracket 58 and into the threaded opening 65. The ground fault circuit receptacle assembly 12 is coupled to the U-shaped bracket 14 so that the non-conductive housing 40 is disposed between the side plates 62, 64. The U-shaped bracket 14 is then disposed within the housing assembly 20 with a side plate 62, 64 adjacent to two parallel side walls 22, 24, and with a round opening 68, 70 adjacent to a pivot opening 23, 25. A pivot pin 80 is inserted through each side wall 22, 24 extending through both an opening 23, 25 and round opening 68, 70. The pivot pin head 82 is then coupled to the stem threaded portion 86, thereby rotatably mounting the U-shaped bracket 14 to the housing assembly 20. The U-shaped bracket 14 may move from a first position, wherein the ground fault circuit receptacle electrical couplings 54 are exposed, to a second, operational position.

The U-shaped bracket 14 is rotated into the first position so that the ground fault circuit receptacle electrical couplings 54 are exposed. Conductors 96, such as wires, are then coupled to both the ground fault circuit receptacle electrical couplings 54 and the electrical coupling 18. The U-shaped bracket 14 is then rotated into the second position. If a deadfront 16 is used, the U-shaped bracket 14 is rotated to align with the angled portion 90 and so that the face plate 52 is aligned with opening 92. The deadfront 16 is then installed over the U-shaped bracket 14, electrical coupling 18 and any additional components 19. Finally, the housing assembly cover 30 is closed, thereby fully enclosing the ground fault circuit receptacle 12.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A rotatable bracket for an electrical receptacle enclosure assembly, said electrical enclosure receptacle assembly having a housing assembly with at least two spaced, generally parallel sides, an electrical coupling, a ground fault circuit receptacle assembly, said ground fault circuit receptacle assembly structured to be coupled to said electrical coupling by a conductor, and a deadfront that is removably coupled to said housing assembly, said rotatable bracket comprising:

a U-shaped rotatable bracket having an elongated, flat base plate and two side plates;

said side plates coupled to opposing axial ends of said base plate and extending generally perpendicular to the plane of said base plate;

said side plates each having a round opening, each said opening aligned with the opening on the other side plate;

said base plate having a rectangular opening sized to fit said ground fault circuit receptacle assembly;

a pair of pivot pins coupled to said parallel sides of said enclosure; and wherein said U-shaped rotatable bracket is rotatably coupled to said enclosure by said pivot pins and said ground fault circuit receptacle assembly is coupled to said U-shaped rotatable bracket at said rectangular opening.

2. The rotatable bracket of claim 1, wherein each said side plate includes an outwardly extending cone disposed about each said round opening.

3. The rotatable bracket of claim 1, wherein:

each said pivot pin includes a head and a threaded portion, and a threaded cap;

said threaded portion structured to be disposed with said head located outside said housing assembly, said threaded portion extending through said housing assembly and one of said two side plates; and said threaded cap structure to engage said the portion.

4. The electrical receptacle enclosure assembly of claim 3, wherein each said side plate includes an outwardly offset landing disposed about each said round opening.

5. The rotatable bracket of claim 1, wherein said ground fault circuit receptacle assembly includes electrical couplings and wherein said U-shaped rotatable bracket is structured to rotate between a first position, wherein the receptacle electrical couplings are exposed, to a second, operational position.

6. The rotatable bracket of claim 1, wherein each said side plate includes an outwardly offset landing disposed about each said round opening.

7. An electrical receptacle enclosure assembly comprising:
- a housing assembly having at least two spaced generally parallel sides;
- an electric coupling disposed within said housing assembly;
- a ground fault circuit receptacle assembly;
- a rotatable bracket having U-shaped rotatable bracket with an elongated, flat base plate and two side plates;
- said side plates coupled to opposing axial ends of said base plate and extending generally perpendicular to the plane of said base plate;
- said side plates each having a round opening, each said opening aligned with the opening on the other side plate;
- said base plate having a rectangular opening sized to fit said ground fault circuit receptacle assembly; and
- a pair of pivot pins coupled to said parallel sides of said enclosure; and
- wherein said U-shape rotatable bracket is rotatably coupled to said enclosure by said pivot pins and said ground fault circuit receptacle assembly is coupled to said U-shape rotatable bracket at said rectangular opening.

8. The electrical receptacle enclosure assembly of claim 7, wherein each said side plate includes an outwardly extending cone disposed about each said round opening.

9. The electrical receptacle enclosure assembly of claim 7, wherein each said pivot pin includes a head and a threaded portion, and a threaded cap;

said threaded portion structured to be disposed with said head located outside said housing assembly, said threaded portion extending through sad housing assembly and one side plate; and said threaded cap structured to engage said threaded portion.

10. The electrical receptacle enclosure assembly of claim 7, wherein said ground fault circuit receptacle assembly includes electrical couplings and wherein said U-shaped shaped rotatable bracket is structured to rotate between a first position, wherein the receptacle electrical couplings are exposed, to a second, operational position.

* * * * *